July 24, 1928. 1,678,002
W. DUISENBERG ET AL
COMBINED MILL, CONVEYER, DRIER, AND CLASSIFIER
Filed Dec. 21, 1927 2 Sheets-Sheet 2
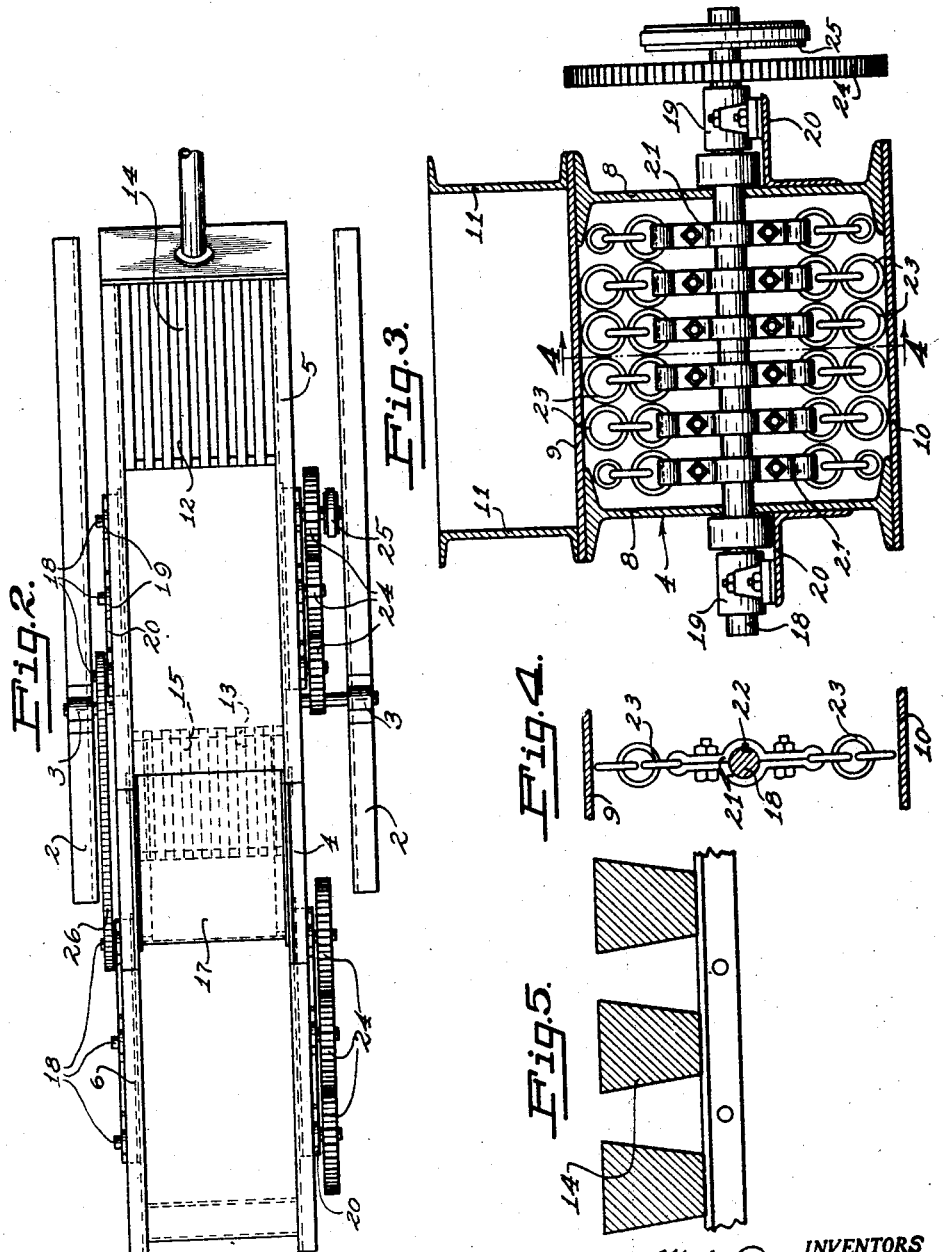
INVENTORS
Walter Duisenberg
John H. Macartney
BY
Harry A. Totten
ATTORNEY.

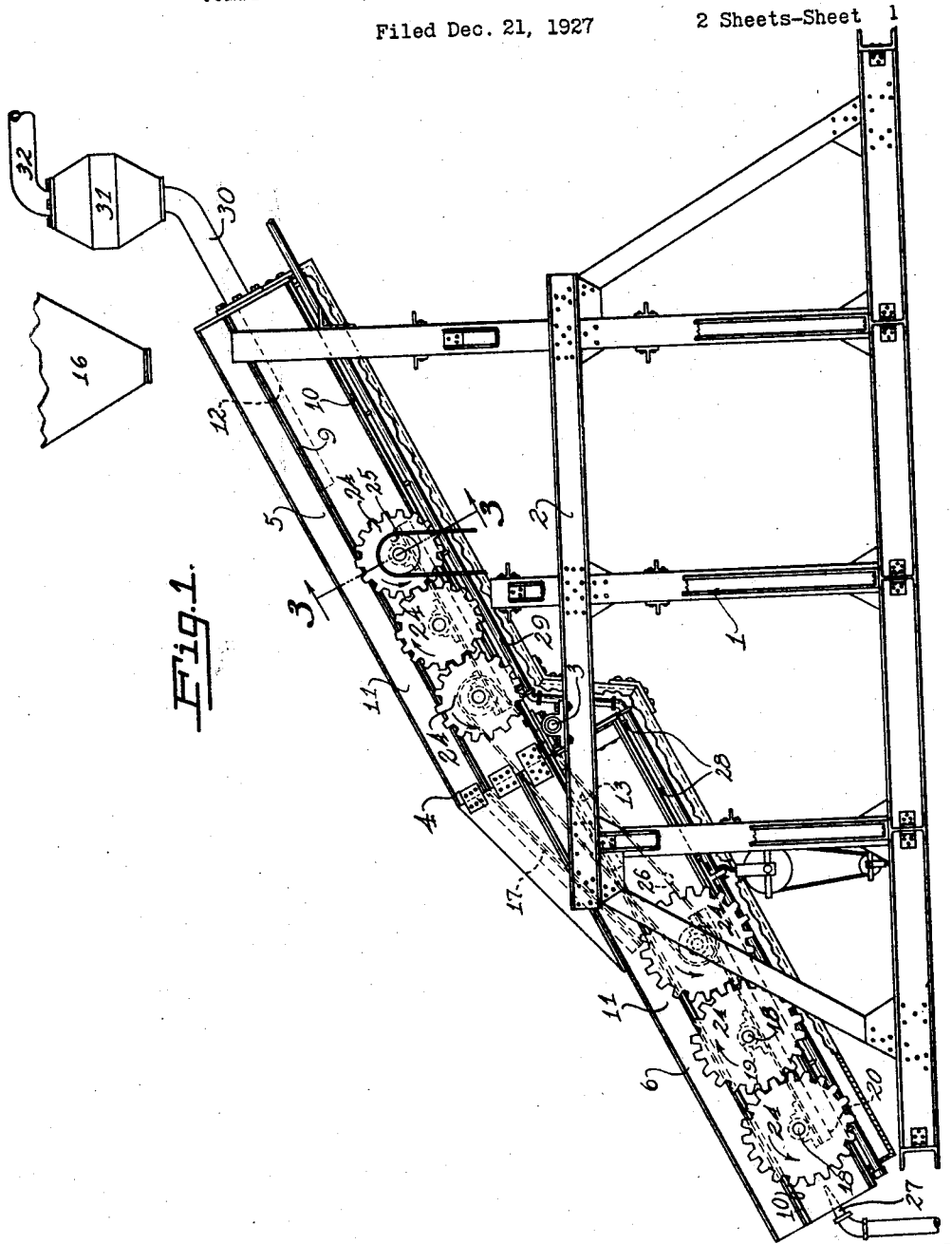

Patented July 24, 1928.

1,678,002

UNITED STATES PATENT OFFICE.

WALTER DUISENBERG, OF LOS GATOS, AND JOHN H. MACARTNEY, OF SAN FRANCISCO, CALIFORNIA.

COMBINED MILL, CONVEYER, DRIER, AND CLASSIFIER.

Application filed December 21, 1927. Serial No. 241,526.

The present invention relates to improvements in mining and mill apparatus and more particularly to a combined mill, conveyer, drier and classifier.

It has been the practice in the past in treating ore to subject the same to the action of a mill, then to classify it, subject it to one or more operations and then if desired to dry it.

The present invention has for its principal object to provide a single apparatus capable of accomplishing the classification, disintegration, drying and conveying of the material. Another object is to provide an apparatus of the above type wherein the material passes by gravity therethrough, and during its passage is subjected to heat for the drying of the same. A further object is to mount an apparatus of the above type so that the gravity feed thereof can be readily controlled by changing the angle of endwise inclination of the apparatus. A further object is to provide an improved form of hammer, mill, or beater units to which the material is subjected in its passage through the apparatus for disintegration to a desired size.

With the above mentioned and other objects in view, the invention consists in the novel construction and combination of parts hereinafter described, illustrated in the accompanying drawings, and set forth in the claims hereto appended, it being understood that various changes in the form, proportion, size and minor details of construction within the scope of the claims may be resorted to without departing from the spirit or sacrificing any of the advantages of the invention.

In its broadest embodiment, the invention consists in an elongated conveyer shell mounted for endwise tilting movement and provided with material feed and discharge openings near its opposite ends with the former of which is associated a grizzly, the grizzly being located in such manner that the material failing to pass therethrough is conveyed longitudinally of the top wall of the shell, and after passing through the grizzly is subjected to the action of mill members during its travel through the discharge opening and is also subjected to the action of heat for the drying of the same.

To more fully comprehend the invention, reference is directed to the accompanying drawings, wherein:—

Fig. 1 is a view in side elevation of one embodiment of our invention.

Fig. 2 is a view in top plan.

Fig. 3 is a transverse section on line 3—3 of Fig. 1.

Fig. 4 is a transverse section on line 4—4 of Fig. 3, and Fig. 5 is a partial sectional view through one of the grizzlies.

In the drawings, wherein like characters of reference designate corresponding parts, 1 indicates a suitable supporting frame of any desired type, to the transverse carrier members 2 of which is fulcrumed at 3 an elongated conveyer shell 4. The shell 4 is illustrated as consisting of two sections 5 and 6 arranged in end to end interconnected relation, Fig. 1. Each section consists of the side wall members 8 united by the top and bottom wall members 9 and 10. The bottom wall member 10 of the section 5 projects beyond the end of the section and forms the top wall of the section 6, this structure locating the section 6 in a plane slightly below that of section 5. Rising from the top wall of the respective sections 5 and 6 are the side guide wall members 11. The top walls are at corresponding ends provided with material inlet openings 12 and 13 covered respectively by the grizzlies 14 and 15, the former being of larger mesh than the latter. The ore previously subjected to the action of any type of apparatus is fed to a delivery member 16 which discharges onto the grizzly 14, the material separated by the grizzly and remaining on the top thereof passing by gravity downwardly over the top wall 9 of the section 5 between the guide walls 11, onto an inclined chute 17 which directs it onto the top wall of the lower shell section 6, from the lower edge of which it passes by gravity to any suitable point. The material passing through the grizzly 14 enters the upper end of the shell section 5 and passes downwardly therethrough, the ore in its movement being acted on by a mill mechanism preferably constructed in the following manner:—

Extending horizontally through the side wall members 8 are a plurality of shafts 18 illustrated as three in number, and the same are rotatably mounted in bearings 19 resting on angle plates 20 carried by the outer surface of the side wall members 8. Within the conveyor shell, each shaft detachably mounts the split clamping members 21, which extend radially from opposite sides thereof, and which are keyed at 22 to rotate therewith. The clamp members at their ends carry a few links of flexible chain structure 23, the same when fully extended from the ends of the clamps approximately contacting with the bottom wall of the shell. Exteriorly of the shell, each shaft carries a gear 24 and adjacent gears intermesh causing the rotation of alternate shafts in opposite directions ensuring a thorough mill action on the material when travelling through the zone of the mill units. Power may be applied to one of the shafts by a pulley 25, the material thus acted on in the shell section 5 is materially reduced in size and passes by gravity from the discharge end of the section 5 onto the grizzly 15 on the upper end of section 6. That material which fails to pass through the grizzly 15 travels by gravity beneath the member 17 and discharges by gravity from the lower edge of the section 6. That material passing through the grizzly 15 which is preferably of a mesh materially less than the mesh of the gizzly 14 is, like the material passing through the upper conveyer shell section 5, acted on by mill members which are preferably duplicates of those previously described as being mounted in section 5. The mill members associated with the shell section 6 are operated preferably by a drive connection 26 with one of the shafts 18 in section 5, as clearly illustrated in Fig. 2 of the drawings.

To ensure complete drying of the material as it passes through the apparatus, heat may be applied to the apparatus in any suitable manner. For convenience, we illustrate a jet nozzle 27 for discharging a heating flame into the lower end of the lower shell section 6, and also a series of burners 28 lying beneath the bottom wall 10 of the respective sections 5 and 6 for their entire length, the burners being supplied with fuel from pipe 29 leading to any suitable source of supply. To reduce the dust in the apparatus, and to separate the extreme lighter particles from the desirable size of crushed material, we prefer to connect with the upper or inlet end of the section 5 a pipe 30 leading into a separator or settling chamber 31 from which extends a suction pipe 32, thus on suction being applied to the pipe 32 the lighter dust particles will be drawn upwardly through the shell and conveyed to any desired point of deposit.

While grizzlies of the keystone bar type are illustrated, it is understood that other types may be employed, and while a particular form of mill structure or disintegrating device is shown and described, it is to be understood that, if found desirable, other forms may be employed. This also being true of the drying mechanism, the type of which may be varied to conform to conditions encountered or the location of the apparatus.

We claim:—

1. A device of the class described comprising superimposed elongated conveying surfaces mounted at an incline and downwardly over which material passes by gravity, a grizzly at the upper end of the upper surface and through which material passes onto the upper end of the lower conveying surface, means for feeding material onto the grizzly, and a plurality of material disintegrating mill members rotatably mounted between the surfaces to coact with the surfaces to crush the material passing through the grizzly in its travel downwardly over the lower surface.

2. A device of the class described comprising superimposed elongated conveying surfaces mounted at an incline and downwardly over which material passes by gravity, a grizzly at the upper end of the upper surface and through which material passes onto the upper end of the lower conveying surface, means for feeding material onto the grizzly, and a plurality of horizontally disposed material beating members rotatably mounted above the lower surface to coact with one of the surfaces to crush the material passing downwardly thereover.

3. A device of the class described comprising superimposed elongated conveying surfaces mounted at an incline and downwardly over which material passes by gravity, a grizzly at the upper end of the upper surface and through which material passes onto the upper end of the lower conveying surface, means for feeding material onto the grizzly, a plurality of material disintegrating mill members rotatably mounted between the surfaces to coact therewith and to act on the material passing through the grizzly to crush the same in its travel downwardly over the lower surface, and means for heating the material to dry the same as it passes over said surfaces.

4. A device of the class described comprising an elongated conveyer shell, a grizzly mounted in one end of the upper wall of said shell, means for delivering material to be classified onto the grizzly, a plurality of material disintegrating mill members mounted within said conveyer shell to cooperate with the shell wall and act on the material passing through said grizzly to crush the same, and means for heating the conveyer shell to dry the material as it passes therethrough.

5. A device of the class described comprising an elongated conveyer shell, a grizzly mounted in one end of the upper wall of said shell, means for delivering material to be classified onto the grizzly, a plurality of material disintegrating mill members mounted within said conveyer shell to coact with said shell walls to crush the material passing through said grizzly, said mill members comprising a supporting shaft disposed transversely of the shell, and a plurality of flexible beaters extending radially from the shaft, and means for rotating the shaft.

6. A device of the class described comprising an elongated conveyer shell, a frame for supporting the same to admit of its adjustment in endwise inclined position, a grizzly mounted in one end of the upper wall of said shell, means for delivering material to be classified onto the grizzly, the material remaining on said grizzly discharging from the end of the upper shell wall and the material passing through said grizzly moving longitudinally of the shell discharging from its end, and a plurality of flexible beater members rotatable within the shell on a horizontal axis for acting on the material as it passes therethrough to disintegrate the same.

7. A device of the class described comprising an elongated conveyer shell, a frame for supporting the same to admit of its adjustment in endwise inclined position, a grizzly mounted in one end of the upper wall of said shell, means for delivering material to be classified onto the grizzly, the material remaining on said grizzly discharging from the end of the upper shell wall and the material passing through said grizzly moving longitudinally of the shell discharging from its end, and a plurality of flexible beater members rotatable within the shell on a horizontal axis for coacting with the shell walls and the material as it passes through the shell to crush the same, certain of said beater members rotating in a direction opposite to the direction of travel of the material in said shell.

8. A device of the class described comprising a plurality of elongated interconnected tubular conveyer shells positioned in end to end relation in uniformly inclined relation, one discharging onto the other with the continuation of the bottom wall of the upper shell forming the top wall of the lower shell, means for mounting said shells to pivot as a unit, a grizzly in the upper end of the top wall of each shell, and a plurality of rotatably mounted material disintegrating members in each shell for coacting with the shell walls and acting on the material to disintegrate the same, and means for operating said members.

9. A device of the class described comprising a plurality of elongated interconnected tubular conveyer shells positioned in end to end relation in uniformly inclined relation, one discharging onto the other with the continuation of the bottom wall of the upper shell forming the top wall of the lower shell, means for mounting said shells to pivot as a unit, a grizzly in the upper end of the top wall of each shell, and a plurality of rotatably mounted material disintegrating members in each shell, means for operating said members for acting on the material to crush the same during its travel through said shells, and means for heating the respective shells.

10. A device of the class described comprising a plurality of elongated interconnected tubular conveyer shells positioned in end to end relation in uniformly inclined relation, one discharging onto the other with the continuation of the bottom wall of the upper shell forming the top wall of the lower shell, means for mounting said shells to pivot as a unit, a grizzly in the upper end of the top wall of each shell, and a plurality of rotatably mounted members in each shell for cooperating with the walls of their respective shells to crush the material as it passes therethrough, and means for simultaneously operating all of said members.

11. A device of the class described comprising an elongated conveyer shell provided with a material inlet opening and a material discharge opening, said openings located adjacent opposite ends of the shell, a horizontal fulcrum for mounting said shell for endwise inclination, a grizzly cooperating with the inlet opening and onto which material to be classified is delivered, whereby the material failing to pass through the grizzly into the shell travels longitudinally of its top wall, and a material disintegrating device rotatable within the shell on a horizontal axis within the path of travel of the material toward said discharge opening and cooperating with the shell walls to crush the material.

12. A device of the class described comprising an elongated conveyer shell provided with a material inlet opening and a material discharge opening, said openings located adjacent opposite ends of the shell, a horizontal fulcrum for mounting said shell for endwise inclination, a grizzly cooperating with the inlet opening and onto which material to be classified is delivered, whereby the material failing to pass through the grizzly into the shell travels longitudinally of its top wall, a shaft extended transversely through the shell and rotatable therein, flexible link beater members carried by the shaft and adapted to extend radially therefrom on the rotation of the shaft, and cooperate on the rotation of the shaft, and cooperating with the shell walls and material for crushing the latter and means for rotating the shaft.

13. A device of the class described comprising an elongated conveyer shell provided with a material inlet opening and a material discharge opening, said openings located adjacent opposite ends of the shell, a horizontal fulcrum for mounting said shell for endwise inclination, a grizzly cooperating with the inlet opening and onto which material to be classified is delivered, whereby the material failing to pass through the grizzly into the shell travels longitudinally of its top wall, a plurality of axially rotatable shafts extended transversely through the shell, a plurality of clamp members detachably carried by the respective shafts and extending radially therefrom, flexible link breaker members carried by the ends of the clamp members to coact with the shell walls and crush the material as it passes through said shell, and means for intergearing the shafts to cause simultaneous axial rotation thereof.

14. A device of the class described comprising a plurality of elongated tubular conveyer shells positioned in end to end relation in uniformly inclined relation, said shells discharging successively one onto the other with the continuation of the bottom wall of one shell forming the top wall of the succeeding shell below, a grizzly in the upper end of the top wall of certain of said shells, and material disintegrating means within certain of said shells to coact with the shell walls and crush the material as it passes therethrough.

In testimony whereof we have signed our names to this specification.

WALTER DUISENBERG.
JOHN H. MACARTNEY.